United States Patent [19]

Kitamura et al.

[11] Patent Number: 5,546,488
[45] Date of Patent: Aug. 13, 1996

[54] WAVEGUIDE-TYPE OPTICAL PATH CONVERTER FOR CONVERTING A PROPAGATION DIRECTION OF A LIGHT

[75] Inventors: Naoki Kitamura; Hiroshi Nishimoto, both of Tokyo, Japan

[73] Assignee: NEC Corporation, Tokyo, Japan

[21] Appl. No.: 322,532

[22] Filed: Oct. 13, 1994

[30] Foreign Application Priority Data

Oct. 14, 1993 [JP] Japan .................................. 5-256214

[51] Int. Cl.⁶ .............................. G02B 6/26; G02B 6/42
[52] U.S. Cl. .................................. 385/45; 385/9
[58] Field of Search .................. 385/9, 18, 30, 385/41, 42, 45

[56] References Cited

U.S. PATENT DOCUMENTS

| | | | |
|---|---|---|---|
| 4,111,521 | 9/1978 | Streifer et al. | 385/18 |
| 4,492,425 | 1/1985 | Kersten et al. | 385/41 |
| 4,732,449 | 3/1988 | Fan . | |

FOREIGN PATENT DOCUMENTS

| | | |
|---|---|---|
| 0053324 | 6/1982 | European Pat. Off. . |
| 0171615 | 2/1986 | European Pat. Off. . |
| 2537733 | 6/1984 | France . |
| 2681436 | 3/1993 | France . |
| 1-261604 | 10/1989 | Japan . |
| 4-367804 | 12/1992 | Japan . |
| WO92/05458 | 4/1992 | WIPO . |

OTHER PUBLICATIONS

Himeno et al; "Loss Measurement . . . "; *J. of Lightwave Tech.;* vol. 6, No. 1; Jan. 1988; pp. 41–46.
Valetti, S., "State of the art of integrated optics technology at LETI for achieving passive optical components", *Journal of Modern Optics,* 1988, vol. 35, No. 6, pp. 993–1005 no month.
A. Himeno et al., "Loss Measurement and Analysis of High–Silica Refelection Bending Optical Waveguides", Journal of Lightwave Technology, Jan. 1988, vol. 6, No. 1, pp. 41–46.

*Primary Examiner*—Rodney B. Bovernick
*Assistant Examiner*—Robert E. Wise
*Attorney, Agent, or Firm*—Young & Thompson

[57] ABSTRACT

A cladding layer covers a part of a substrate and two core layers are formed in the cladding layer. The two core layers merge with each other and a head of a common part of the two core layers appears on a side wall of the cladding layer. A guide portion is located near the side wall. A reflective body having an end face coated with a reflective film is positioned by the guide portion so that the head of a common part of the two core layers adheres to the reflective film.

12 Claims, 4 Drawing Sheets

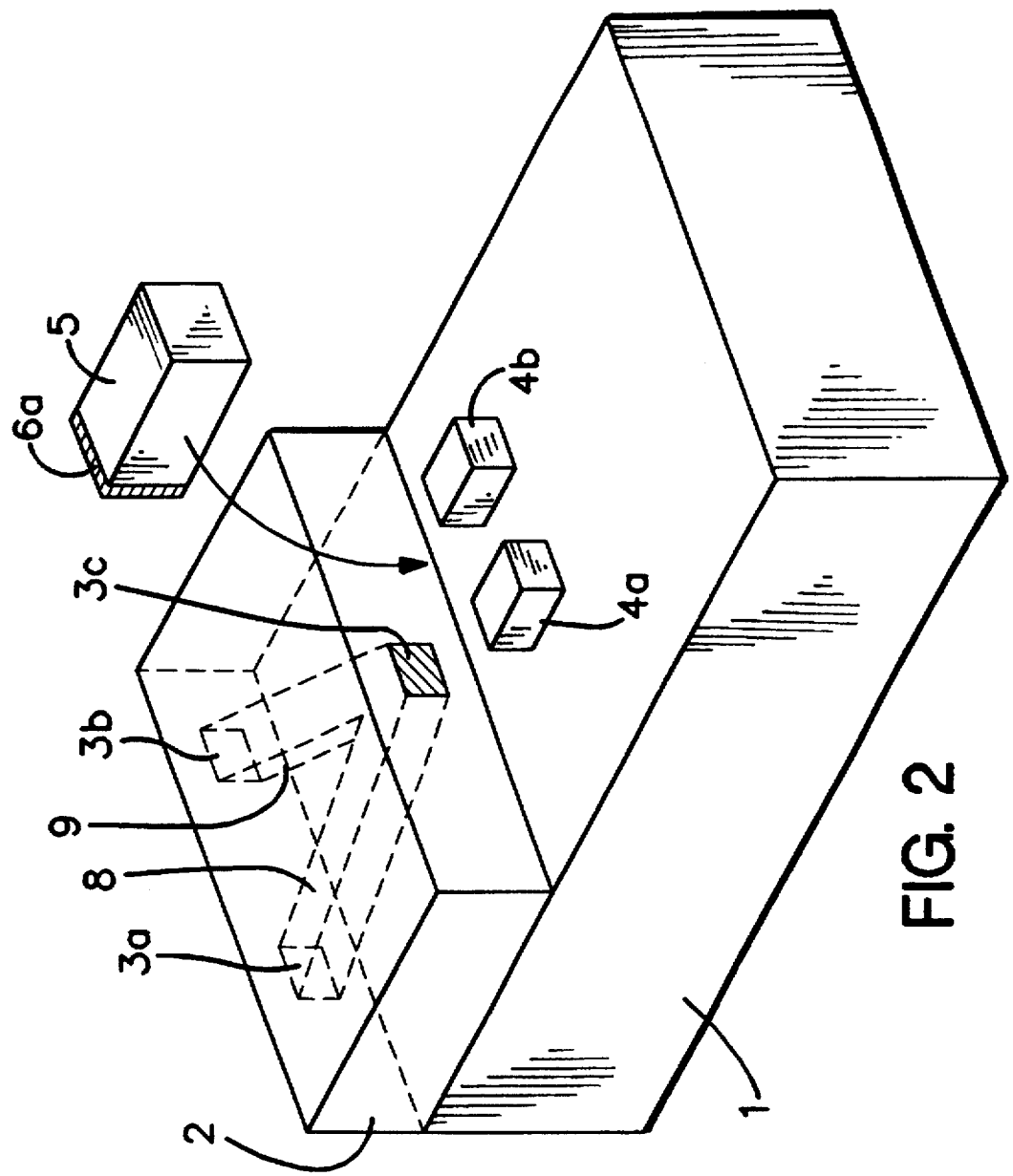

WAVEGUIDE-TYPE OPTICAL PATH CONVERTER FOR CONVERTING A PROPAGATION DIRECTION OF A LIGHT

BACKGROUND OF THE INVENTION

This invention relates to an optical path converter, and more particularly relates to a waveguide-type optical path converter for converting a propagation direction of light using an end face reflection technique.

Optical communication-systems and optical signal switching systems typically include an optical modulator, optical switch and optical multiplexer/separator, etc., which are optical waveguide-type devices. Recently, research on optical wiring and the like on an optical waveguide substrate has been carried out and techniques for efficient arrangement with little loss of optical waveguide-type devices are of increasing importance. Among them, an optical path converting technique for converting a propagation direction of light is important to miniaturize apparatus which use optical devices.

As an optical path conversion technique, an end face reflection technique is well known in the art. For example, this technique is disclosed in S. Valette, "State of the art of integrated technology at LETI for achieving passive optical components", Journal of Modern Optics, 1988, Vol. 35, No. 6, pp. 993–1005.

The end face reflection technique has a feature that optical path conversion efficiency is high and it has a wide range of optical path conversion. In this technique, an end face of a substrate and a waveguide is ground so that an angle between a waveguide face and the end face being ground becomes 90 degrees and so that a head of the waveguide appears on a face being ground. Next, the ground face is coated with a reflective film.

Referring to FIG. 1, a conventional waveguide-type optical path converter will be described. FIG. 1 shows a perspective view of the conventional converter.

In FIG. 1, a silicon (Si) crystal substrate 1 is covered with a cladding layer 2, in which first and second core layers 8 and 9 are formed. The cladding layer 2 and the first and second core layers constitute two optical waveguides. The first and second core layers 8 and 9 merge with each other near one side of the cladding layer 2.

An end face of a common core layer 3c is exposed by cutting the common core layer at a plane normal to the waveguides. The exposed face is ground and is covered with a reflective film 6.

In addition, the other ends 3a and 3b of the first and the second core layers appear on the opposite side of the cladding layer 2.

Since the cladding layer 2 has a lower refractive index than that of the core layers 8 and 9, light propagates mainly through the core layers.

When light is inputted through the end surface 3a of the first core layer 8, the input light propagates mainly through the first core layer 8 to the end surface 3c of the merged or common core layer. The light is reflected at the reflective film 6. The reflected light propagates through the second core layer 9 and is outputted through the end surface 3b of the second core layer. Thus, the propagation direction of the light is changed ("converted").

Although this conventional waveguide-type optical path converter has several advantages, it nevertheless has a disadvantage in that the location at which the optical path changes direction is limited to the end face of a substrate. Therefore, it is impossible to accomplish optical path conversion at positions other than ends of a substrate. Moreover, the conventional converter has another disadvantage in that its fabrication process is complex and unsuitable for mass production because of the requirement for grinding of the waveguide end face and the coating of the waveguide end face with the reflective film one device by one device.

SUMMARY OF THE INVENTION

Therefore, it is a principal object of the present invention to provide a waveguide-type optical path converter which is not subject to any limitation as regards the position of optical path conversion and which requires no complex fabrication process.

According to one aspect of the invention, there is provided a waveguide-type optical path converter comprising:

a substrate;

a cladding layer formed on the substrate for covering part of the surface of the substrate;

two core layers formed in the cladding layer and merging with each other near a vertical wall of said cladding layer, wherein a merged head portion of the two core layers appears on the vertical wall of the cladding layer;

a reflective body having an end face coated with a reflective film; and guide means located on the substrate for holding the reflective body so that the reflective film of the reflective body adheres to the merged head portion of the two core layers.

According to another aspect of the invention, there is provided a waveguide-type optical path converter comprising:

a substrate;

a cladding layer for covering at least part of the surface of the substrate;

two core layers formed in said cladding layer;

a directional coupler having two ends connected respectively to the two core layers, and a length which is a half of a full coupling length, for optically coupling the two core layers with each other;

a reflective body having an end face coated with a reflective film; and guide means located on the substrate for holding the reflective body so that the reflective film adheres to the other two ends of the directional coupler.

BRIEF DESCRIPTION OF THE DRAWINGS

FIG. 2 shows a partially exploded perspective view of a first preferred embodiment of the invention;

DETAILED DESCRIPTION OF PREFERRED EMBODIMENTS

Figure 1:
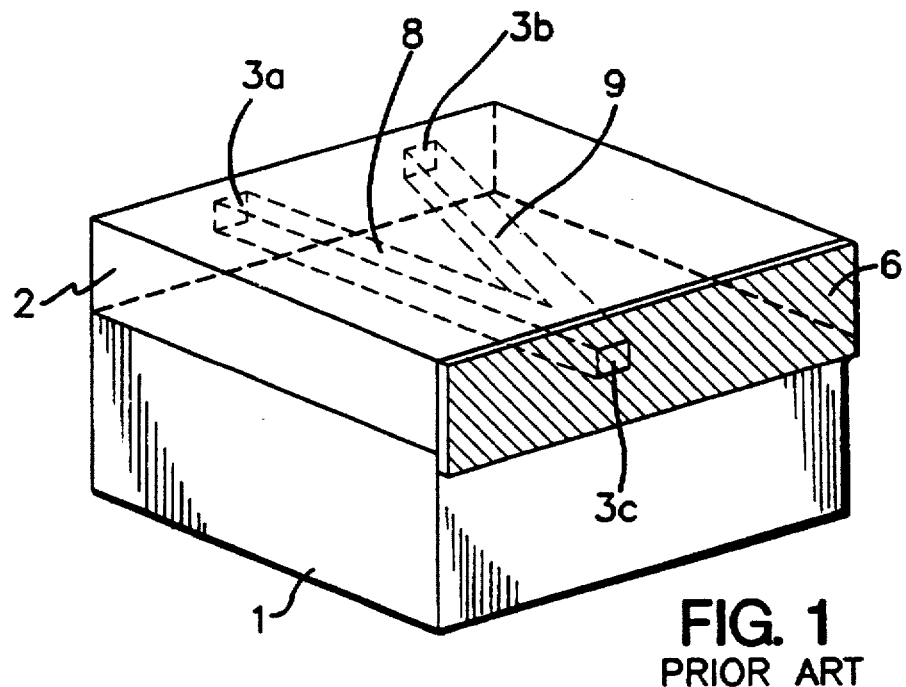
FIG. 1 shows a perspective view of a conventional waveguide-type optical path converter.

Referring to FIG. 2, a first preferred embodiment will now be described. In FIG. 2, a cladding layer 2 covers only part of the upper planar surface of a Si crystal substrate 1, and first and second core layers 8 and 9 are formed in the cladding layer 2. The core layers 8 and 9 merge with each other near one end of the cladding layer 2.

The cladding layer 2 and the first and second core layers 8 and 9 may be formed by a CVD method, a sputtering method, a flame stacking method or the like.

Where the two core layers merge, a face 3c of the merged or common core layer is exposed by cutting the common core layer and the cladding layer at a plane perpendicular to the cladding layer 2 and the two core layers 8 and 9. The cutting may be performed by etching. However, the vertical exposed face does not necessarily reach the substrate 1 in the etching process.

In this embodiment, projection guides 4a and 4b are left on the substrate 1 as shown in FIG. 2. The projection guides can be fabricated simultaneously when the common core layer and the cladding layer 2 are etched.

In addition, this embodiment further includes a reflecting body 5 of square or rectangular cross section, which is fabricated so that its width matches a slot between the two projection guides 4a and 4b. An end face of the reflecting body 5 is coated with a reflective film 6a as shown in FIG. 2. The reflective body 5 is guided along the slot between projection guides 4a and 4b towards the end face 3c of the common core layer so that the reflective film 6a and the face 3c adhere to each other.

Therefore, light propagating from the end face 3a of the first core layer toward the face 3c is reflected at the reflective film 6a and is emitted from the end face 3b. This action of optical path conversion is substantially similar to that of the conventional converter of FIG. 1.

In this embodiment, the reflecting body is preferably made of a material with the same or almost the same thermal expansion coefficient as that of the cladding layer and the core layers in order to prevent any misalignment or detachment of the reflecting film and the face 3c of the common core layer due to thermal changes. For example, when the substrate 1, the cladding layer and core layers are made of quartz-based materials, an optical fiber may be used as the reflective body 5.

In this embodiment, there is no need to locate the place for optical path conversion only at an end of the substrate 1, and optical path conversion points can be located anywhere on the substrate.

Moreover, in this embodiment, the reflective film may be made of a metal with high reflectance, such as aluminum (Al) or silver (Ag). Since reflective films on many reflective bodies can be collectively formed by an electron beam (EB) vapor-deposition method, a sputtering method or the like, this embodiment is suitable for mass production.

Figure 3:
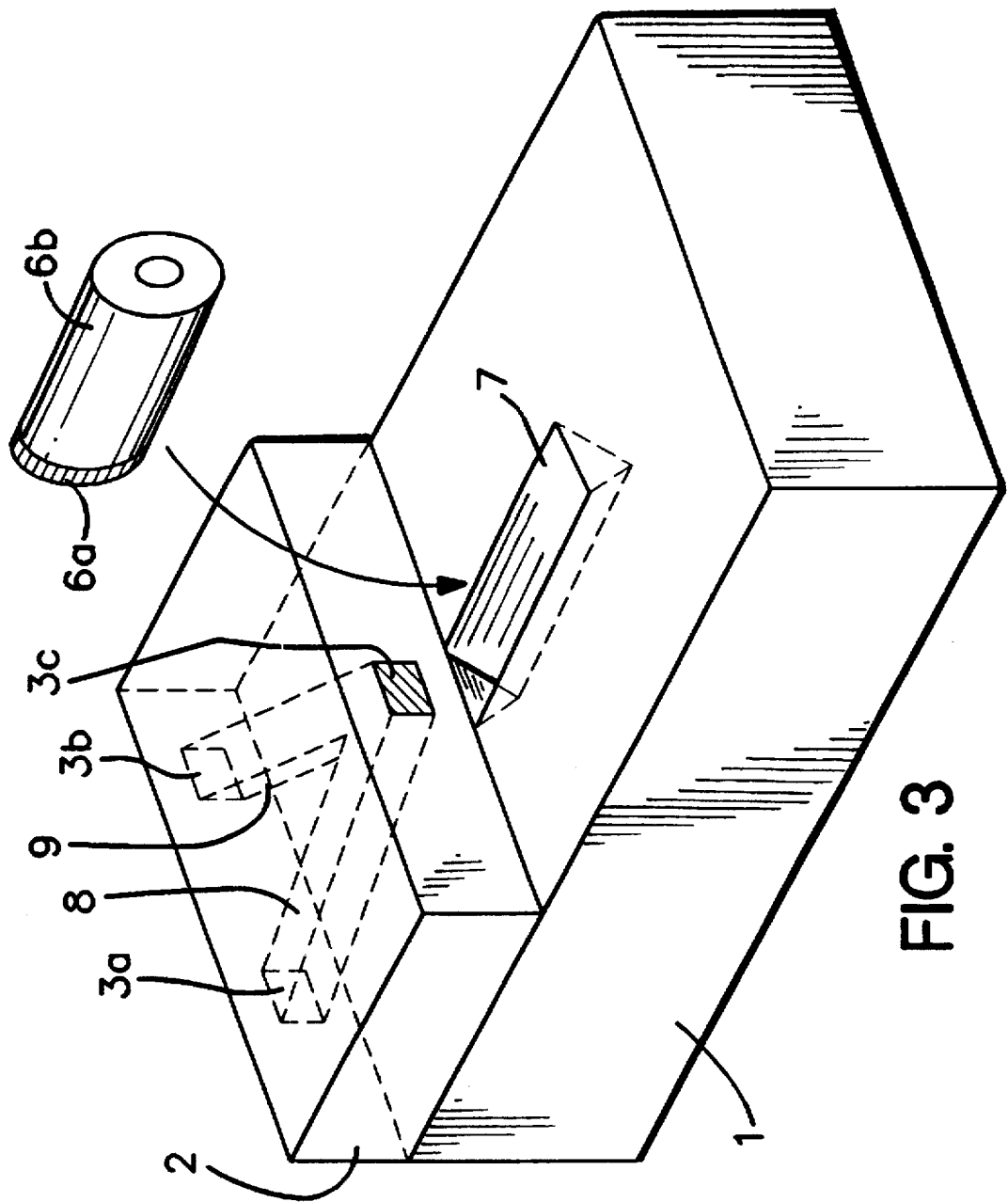
FIG. 3 shows a partially exploded perspective view of a second preferred embodiment of the invention.

Referring to FIG. 3, a second preferred embodiment of the invention will now be described.

As shown in FIG. 3, this embodiment has a V shaped groove 7 on the substrate 1 instead of the two projection guides 4a and 4b of the first embodiment. In addition, in this embodiment, an optical fiber 6b, one end face of which is coated with a reflective film 6a, is used as the reflective body.

In this embodiment, the reflective body 6b, 6a is positioned by the V groove 7, and the reflective film 6a adheres to the face 3c of the common core layer, which is an exposed face fabricated by the same process as in the first embodiment.

Formation of the V groove 7 may be accomplished by anisotropic etching of the substrate 1. For example, when the substrate 1 is made of Si crystal, the V groove 8 consisting of a (111) face is fabricated by anisotropic etching of a (100) face.

This technique to couple the optical fiber 6b with the common core layer via the V groove 8 is the same as that already being used to couple an input or output optical fiber with a waveguide on a substrate via a V shaped groove (for example, see, Japanese Laid-Open Publication No. 1-261604 (1989)). Therefore, the V groove 7 is fabricated simultaneously with V grooves for coupling optical fibers with optical waveguides on the substrate. This simplifies the fabrication process of an optical device on the substrate.

In this embodiment, the substrate 1 may be made of Si, GaAs, or InP. When the substrate is made of Si, the optical waveguide may be made of a P, Ge or B doped quartz material. When a GaAs or InP substrate is used, a semiconductor-based material may be used as the waveguide materials.

As an anisotropic etching liquid, a solution of KOH, KOH+alcohol, ethylenediamine+pyrocatechol or the like is used for Si crystal substrate and a solution of HCl+$H_3PO_4$ or the like for an InP substrate.

For the etching mask, a material which is etched more slowly by the etching liquid than the face (100) of the substrate is used. For example, a $SiO_2$ thermally oxidized film, a metal film or the like is used as the etching mask material.

Figure 4:
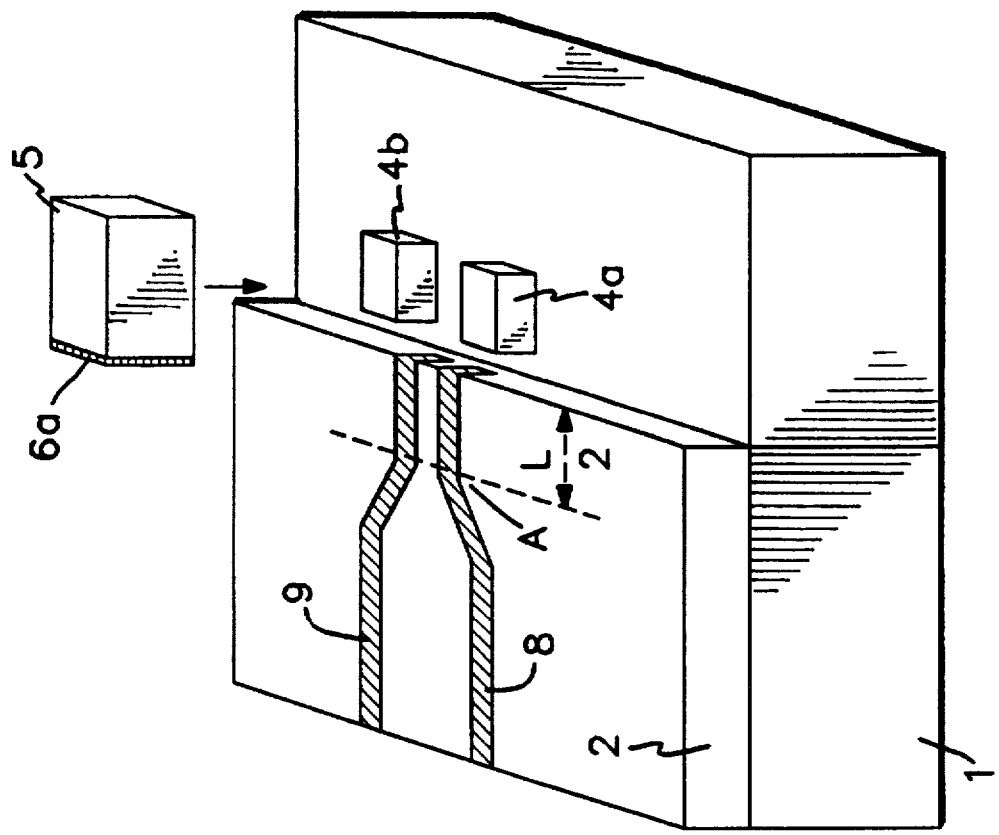
FIG. 4 shows a partially exploded perspective view of a third preferred embodiment of the invention.

Referring to FIG. 4, a third preferred embodiment of the invention will now be described. In FIG. 4, the upper part of cladding layer is shown removed so that the core layers 8 and 9 are exposed in order to indicate the embodiment in detail.

The third embodiment includes a directional coupler 26, in which two optical waveguides are optically-coupled with each other, on the substrate 1. The directional coupler 26 has a length (L/2), which is a half of a full coupling length (L) of a directional coupler. Two ends of the directional coupler are connected to the core layers 8 and 9, respectively.

The other two ends of the directional coupler appears on a side wall of an H shaped guide hole 25, in which the reflective body 5 is inserted. The reflective body 5 is positioned by two projecting guides 24a and 24b. The exposed surface of the directional coupler on the side wall of the hole 25 is adhered to the reflective film 6a of the reflective body 5.

In this embodiment, input light to the core layer 8 is supplied to the point A of the directional coupler 26, proceeds over the distance (L/2) and reaches the reflective film 6a. Light reflected at the reflective film 6a proceeds over the distance (L/2), propagates into the core layer 9 and is outputted from the substrate.

The combination of the directional coupler 26 with a half of the full coupling length, and the reflective film 6a of the reflective body, therefore makes an optical path conversion.

Figure 5:
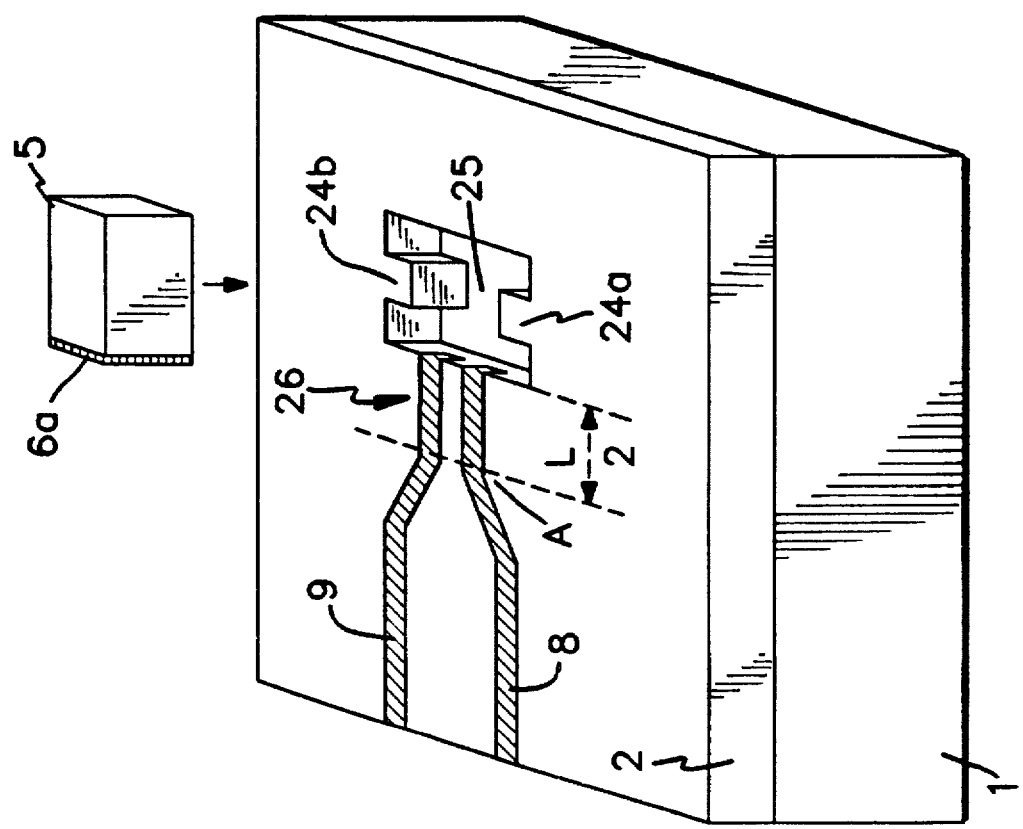
FIG. 5 shows a partially exploded perspective view of a fourth preferred embodiment of the invention.

While the guide hole 25 is used for holding the reflective body, a pair of projection guides 4a and 4b as in FIG. 2 may be used instead of the guide hole 25. This modification constitutes a fourth preferred embodiment, which is shown in FIG. 5.

Figure 6:
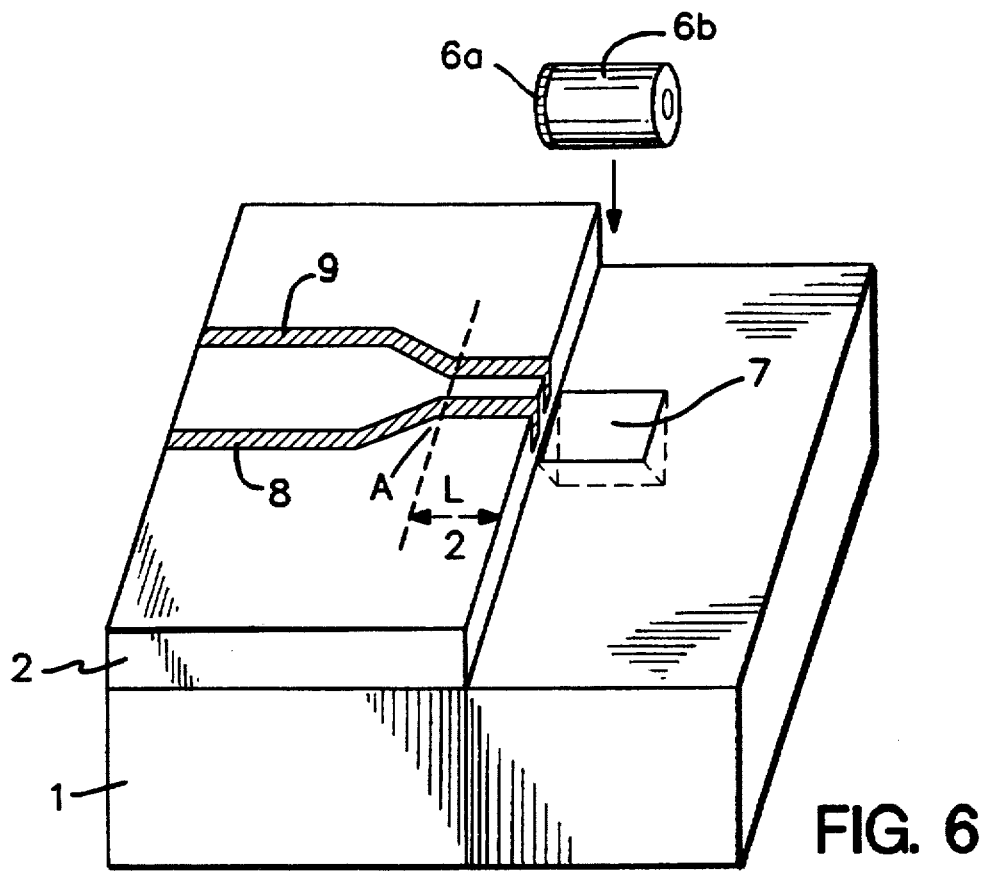
FIG. 6 shows a partially exploded perspective view of a fifth preferred embodiment of the invention.

Moreover, the V groove 7 of FIG. 3 may be used instead of the guide hole 25. This modification constitutes a fifth preferred embodiment, which is shown in FIG. 6.

As described in the above, the invention provides a waveguide-type optical path converter which is not subject to any limitation as to the position of the optical path conversion and which does not require a complex fabrication process. In the above embodiments, it will be appreciated that the location of optical path conversion is disposed not only intermediate the longitudinal sides of the substrate, as in the prior art, but also intermediate the transverse sides of the substrate.

Although the present invention has been described in connection with various provided embodiments thereof, it will be appreciated that these embodiments are provided solely for purposes of illustration, and should not be construed as limiting the scope of the invention. Other embodiments and applications of the invention will be readily apparent to those skilled in the art from reading the present specification and practicing the techniques described herein, without departing whatsoever from the scope and spirit of the appended claims.

We claim:

1. A waveguide-type optical path converter, comprising:

a substrate;

a cladding layer of quartz-based material covering at least part of a surface of the substrate;

two core layers of quartz-based material formed in said cladding layer and merging with each other near a vertical wall of said cladding layer;

wherein a merged head portion of said two core layers appears on said vertical wall of said cladding layer;

a reflective body having an end face coated with a reflective film; and guide means located on the substrate for positioning the reflective body so that the reflective film adheres to said merged head portion of said two core layers.

2. The optical path converter as claimed in claim 1, wherein said guide means is a pair of projections formed on said substrate.

3. The optical path converter as claimed in claim 1, wherein said reflective body is an optical fiber.

4. The optical path converter as claimed in claim 1, wherein said guide means is a groove formed on said substrate adjacent said vertical wall.

5. The optical path converter as claimed in claim 4, wherein said reflective body is an optical fiber.

6. A waveguide-type optical path converter, comprising:

a substrate;

a cladding layer covering at least part of a surface of said substrate;

two core layers formed in said cladding layer;

a directional coupler having two ends connected to said two core layers, respectively, and a length which is a half of a full coupling length, for optically coupling the two core layers with each other;

a reflective body having an end face coated with a reflective film; and guide means located on the substrate for positioning said reflective body so that said reflective film adheres to the opposite two ends of said directional coupler.

7. The optical path converter as claimed in claim 6, wherein said guide means is a hole on said cladding layer and said other two ends of said directional coupler appear on a side wall of said hole.

8. The optical path converter as claimed in claim 6, wherein said reflective body is an optical fiber.

9. The optical path converter as claimed in claim 6, wherein said guide means is a pair of projections formed on said substrate.

10. The optical path converter as claimed in claim 8, wherein said reflective body is an optical fiber.

11. The optical path converter as claimed in claim 6, wherein said guide means is a groove formed on said substrate.

12. The optical path converter as claimed in claim 11, wherein said reflective body is an optical fiber.

* * * * *